United States Patent [19]

Mallary

[11] Patent Number: 5,654,854
[45] Date of Patent: Aug. 5, 1997

[54] LONGITUDINALLY BIASED MAGNETORESISTIVE SENSOR HAVING A CONCAVE SHAPED ACTIVE REGION TO REDUCE BARKHAUSEN NOISE BY ACHIEVING A SUBSTANTIALLY SINGLE MAGNETIC DOMAIN STATE

[75] Inventor: Michael L. Mallary, Berlin, Mass.

[73] Assignee: Quantum Corporation, Milpitas, Calif.

[21] Appl. No.: 565,032

[22] Filed: Nov. 30, 1995

[51] Int. Cl.$^6$ .................................................. G11B 5/39
[52] U.S. Cl. ............................................................ 360/113
[58] Field of Search ...................... 360/113; 324/207.21, 324/252

[56] References Cited

U.S. PATENT DOCUMENTS

| | | | |
|---|---|---|---|
| 3,840,898 | 10/1974 | Bajorek et al. | 360/113 |
| 4,639,806 | 1/1987 | Kira et al. | 360/113 |
| 4,663,685 | 5/1987 | Tsang | 360/113 |
| 4,713,708 | 12/1987 | Krounbi et al. | 360/113 |
| 4,771,349 | 9/1988 | Tsang | 360/113 |
| 4,782,414 | 11/1988 | Krounbi et al. | 360/113 |
| 4,809,109 | 2/1989 | Howard et al. | 360/113 |
| 4,825,325 | 4/1989 | Howard et al. | 360/113 |
| 4,841,398 | 6/1989 | Mowry | 360/113 |
| 4,899,240 | 2/1990 | McClure | 360/113 |
| 5,005,096 | 4/1991 | Krounbi et al. | 360/113 |
| 5,065,094 | 11/1991 | Mowry | 360/113 |
| 5,206,590 | 4/1993 | Dieny et al. | 360/113 |
| 5,485,334 | 1/1996 | Nix et al. | 360/113 |

FOREIGN PATENT DOCUMENTS

| | | |
|---|---|---|
| 0375646A2 | 6/1990 | European Pat. Off. . |
| 0422806A2 | 4/1991 | European Pat. Off. . |

OTHER PUBLICATIONS

Composite Films as a Domain–Wall Barrier—R. P. Hunt and A. A. Jaecklin Journal of Applied Physics, vol. 37, No. 3, 1 Mar. 1966.

*Primary Examiner*—A. J. Heinz
*Attorney, Agent, or Firm*—David B. Harrison; Debra A. Chun; William J. Kubida

[57] ABSTRACT

A magnetoresistive ("MR") sensor constructed with a concave shaped edge in order to provide an effective longitudinal bias field in the center of the active MR element sufficient to obviate multi-domain states and concomitant Barkhausen noise. Utilizing the concave shape proposed herein, the "stripe height" of the element is at a minimum in the center of the active region and increases toward the off-track boundary. In a preferred embodiment, a substantially constant effective longitudinal bias field may be obtained throughout the active MR element if the stripe height increases as an exponential function of the square of the off-track distance. The principles of the present invention are likewise applicable to use in spin valve ("SV") and other giant magnetoresistive ("GMR") sensors.

40 Claims, 4 Drawing Sheets

LONGITUDINALLY BIASED MAGNETORESISTIVE SENSOR HAVING A CONCAVE SHAPED ACTIVE REGION TO REDUCE BARKHAUSEN NOISE BY ACHIEVING A SUBSTANTIALLY SINGLE MAGNETIC DOMAIN STATE

CROSS REFERENCE TO RELATED APPLICATIONS

The present invention is related to the subject matter of U.S. Pat. No. 5,485,334 issued Jan. 16, 1996, (application Ser. No. 08/392,393 filed Feb. 22, 1995) for "Magnetoresistive Device and Method Having Improved Barkhausen Noise Suppression" and U.S. patent applications Ser. No. 08/461,874 filed Jun. 5, 1995 for "Soft Adjacent Layer Biased Magnetoresistive Device Incorporating a Natural Flux Closure Design Utilizing Coplanar Permanent Magnet Thin Film Stabilization" and Ser. No. 08/401,553 filed Mar. 9, 1995 for "Shaped Spin Valve Type Magnetoresistive Transducer and Method for Fabricating the Same Incorporating Domain Stabilization Technique". The foregoing patent and patent applications are assigned to Quantum Peripherals Colorado, Inc., Louisville, Colo., the disclosures of which are hereby specifically incorporated by this reference.

BACKGROUND OF THE INVENTION

The present invention relates, in general, to the field of magnetoresistive ("MR"), giant magnetoresistive ("GMR") and spin valve ("SV") type devices for use as magnetic "read" heads in computer mass storage devices such as disk and tape drives. More particularly, the present invention relates to a magnetoresistive sensor having a concave shape in the plane of the element in order to achieve a substantially single magnetic domain state and thereby reduce Barkhausen noise.

Magnetoresistive sensors are known to be useful in reading data from a magnetic surface with a sensitivity exceeding that of inductive or other thin film heads. In operation, an MR sensor is used to detect magnetic field signal changes as a function of the direction and amount of magnetic flux being sensed. It is also known that for an MR sensor to function effectively, it must be subjected to a transverse bias field to linearize its response. Various techniques for effectuating such transverse biasing are known, including current shunt, "barber pole" and soft adjacent film biasing. The transverse bias field is applied normal to the plane of the magnetic media and parallel to the surface of the MR sensor.

It is also known that an MR sensor may be utilized in conjunction with a longitudinal bias field extending parallel to the surface of the magnetic media and parallel to the major axis of the MR sensor. Stabilization of MR sensors by means of a longitudinal bias field is necessary for their application in high track density disk drives in order to suppress Barkhausen noise. Barkhausen noise results from unstable magnetic properties such as multi-domain states within the MR element which may appear, for example, following a magnetic disturbance from an associated write head or other external magnetic field source.

In this regard, magnetoresistive and spin valve magnetic recording "read" elements are commonly stabilized with antiferromagnetic ("AF") materials such as ferromanganese ("FeMn") or a permanent magnet ("PM") layer comprising cobalt platinum ("CoPt"), cobalt platinum tantalum ("CoPtTa") or cobalt platinum chromium ("CoPtCr") in order to pin the off-track boundaries and obtain a single magnetic domain state throughout the active MR element. However, the effectiveness of such boundary bias approaches diminishes in the center of the active region due to the fact that the flux rapidly leaks out of conventionally shaped (rectangular or convex) elements as the distance to the boundary increases. This undesired flux leakage results in multi-domain states with associated Barkhausen noise on read back and concomitant instability problems.

SUMMARY OF THE INVENTION

The present invention utilizes a concave shape to provide an effective bias field in the center of the active MR element in order to obviate multi-domain states. Utilizing a concave shape as proposed herein, the "stripe height" of the element is at a minimum in the center and increases toward the off-track boundary. In a preferred embodiment, a substantially constant effective longitudinal bias field is obtained throughout the active MR element if the stripe height increases as an exponential function of the square of the off-track distance.

In a preferred embodiment, the concave shape may curve substantially parabolically towards the center of the air bearing surface ("ABS") and the gradient of free poles that results from this shape induces an effective bias field for the entire active region of the element thereby providing more robust magnetic stability for the MR element.

Particularly disclosed herein is a magnetoresistive sensor having first and second longitudinal biasing elements disposed adjacent opposing first and second end portions of an active magnetoresistive region having interconnecting first and second side portions thereof. The magnetoresistive region comprises an active track width substantially defined by a distance between the first and second end portions and a stripe height defined by a distance between the first and second side portions with the stripe height decreasing with distance from the first and second end portions toward a substantially median point.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1:
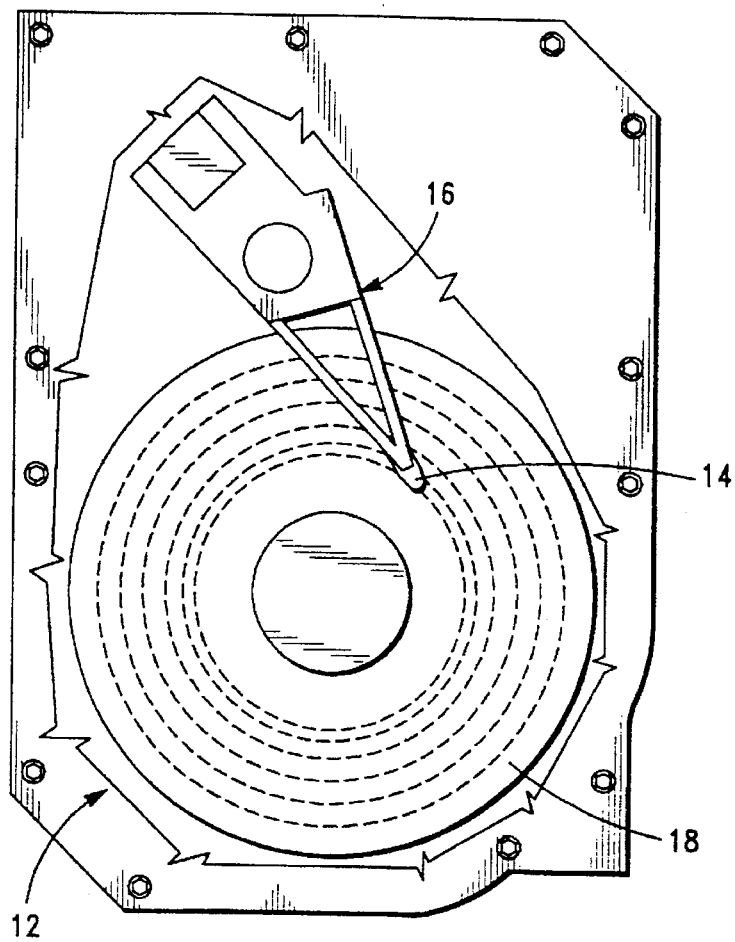
FIG. 1 is a simplified, cut-away, top plan view of a conventional disk drive constituting one application of the concave MR element of the present invention as a magnetic "read" head.

With reference now to FIG. 1, a simplified, cutaway, top plan view of a disk drive 10 is shown for possible use in conjunction with the MR sensor of the present invention. The disk drive 10 comprises, in pertinent part, a number of disks 12 which are rotated about a central axis. A read/write head 14, which may include an MR sensor in accordance with the present invention as a "read" element, is positioned by means of a positioner 16 with respect to a number of concentric data tracks on the surfaces 18 of the disks 12 to enable data to be written to, or read from, the magnetically hard surfaces 18 thereof. The MR sensor hereinafter disclosed may also be utilized in conjunction with tape drives and other computer mass storage applications as well.

Figure 2A:
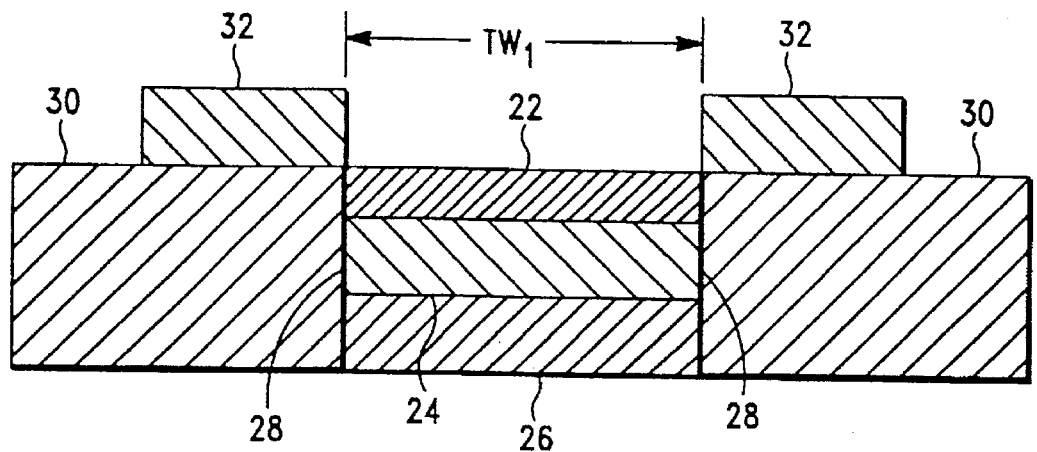
FIG. 2A is a simplified air bearing surface ("ABS") view of a permanent magnet biased MR element comprising a soft adjacent layer ("SAL") and overlying magnetic spacer layer ("MSL") in conjunction with an MR layer to produce a magnetoresistive structure "MRS")

With reference additionally now to FIG. 2A, an MR sensor 20 is shown. The MR sensor 20 comprises, in pertinent part, an MR layer 22 overlying a magnetic spacer layer ("MSL") 24 and underlying soft adjacent layer 26 ("SAU"). The three layers 22–26 comprise a magnetoresistive structure ("MRS") with the soft adjacent layer 26 providing a transverse bias to the active MR layer 22.

As disclosed in the aforementioned United States Patent, a pair of separation layers 28 provides spacing between a pair of opposing permanent magnet regions 30 and the end portions of the MRS structure and define the off-track boundaries of the active region of the MR sensor 20. Contacts 32 may provide electrical connection to the permanent magnet regions 30 as shown with the track width of the MR sensor 20 being substantially the distance between the contacts 32 of $TW_1$ and the length of the MR layer 22.

Figure 2B:
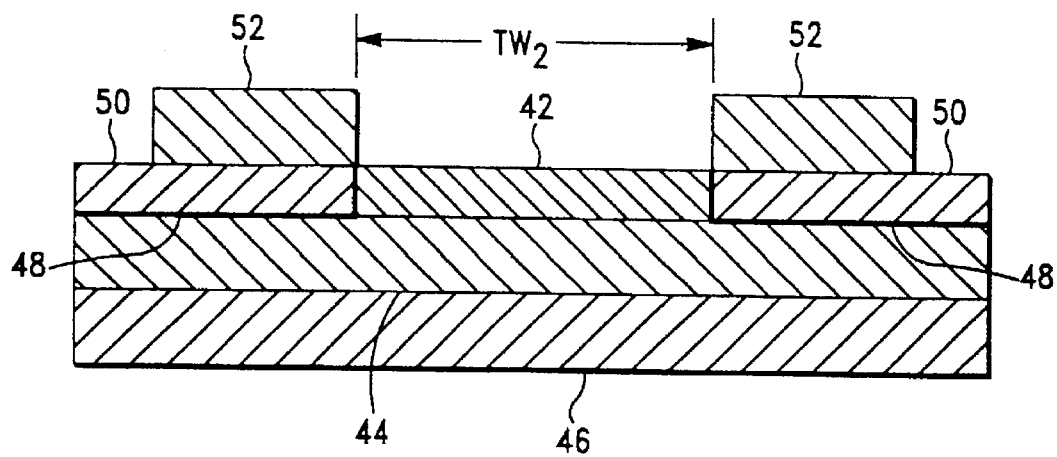
FIG. 2B is an additional simplified ABS view of a permanent magnet biased MR element wherein the MR layer is shortened with respect to the underlying SAL and MSL layers to produce a flux closure design.

With reference additionally now to FIG. 2B, an alternative embodiment of an MR sensor 40 is shown incorporating a natural flux closure design as disclosed in U.S. patent application Ser. No. 08/461,874. The MR sensor 40 comprises, in pertinent part, an MR layer 42 shortened in length and overlying a magnetic spacer layer 44 and underlying soft adjacent layer 46. The three layers 42–46 comprise a magnetoresistive structure with the soft adjacent layer 46 providing a transverse bias to the active MR layer 42.

As disclosed in the aforementioned United States patent and patent applications, a pair of separation layers 48 overlie portions of the magnetic spacer layer 44 and also provide spacing between a pair of opposing permanent magnet layers 50 and the end portions of the MR layer 42 at the off-track boundaries of the active region. As in the preceding embodiment, contacts 52 may provide electrical connection to the permanent magnet layers 50 as shown with the track width of the MR sensor 40 being substantially the distance between the contacts 52 of $TW_2$ and the length of the MR layer 42.

Figure 3A:
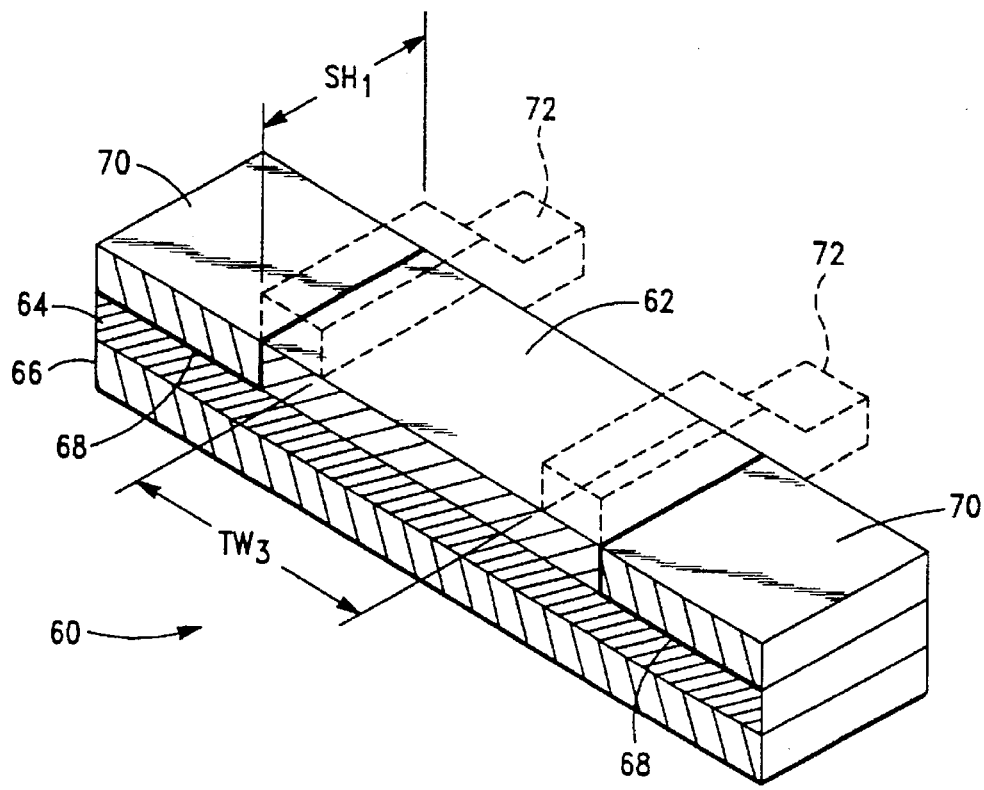
FIG. 3A is an isometric view of the MR element of FIG. 2B further illustrating the separation layer between the ends of the MR layer and the permanent magnet layers as well as an alternative placement of the conductors contacting the MR layer and defining the track width of the active region.

With reference additionally now to FIG. 3A an isometric view of an MR sensor 60 similar in structure to the MR sensor 40 of FIG. 2B is shown. MR sensor 60 includes an MR layer 62 overlying a magnetic spacer layer 64 which, in turn, overlies a soft adjacent layer 66. A pair of permanent magnet layers 70 provide longitudinal bias to the MR layer 62 and are separated therefrom by corresponding separation layers 68 at the off-track boundaries of the active region of the MR sensor 60.

In this embodiment, contacts 72 (shown in phantom) may overlie and provide electrical connection directly to the MR layer 62 as opposed to the configuration of the preceding FIGS. 2A–2B in which they overlie the permanent magnet layers. The track width of the MR sensor 60 is then substantially the distance between the contacts 72, or $TW_3$ with the stripe height given as the distance $SH_1$.

Figure 3B:
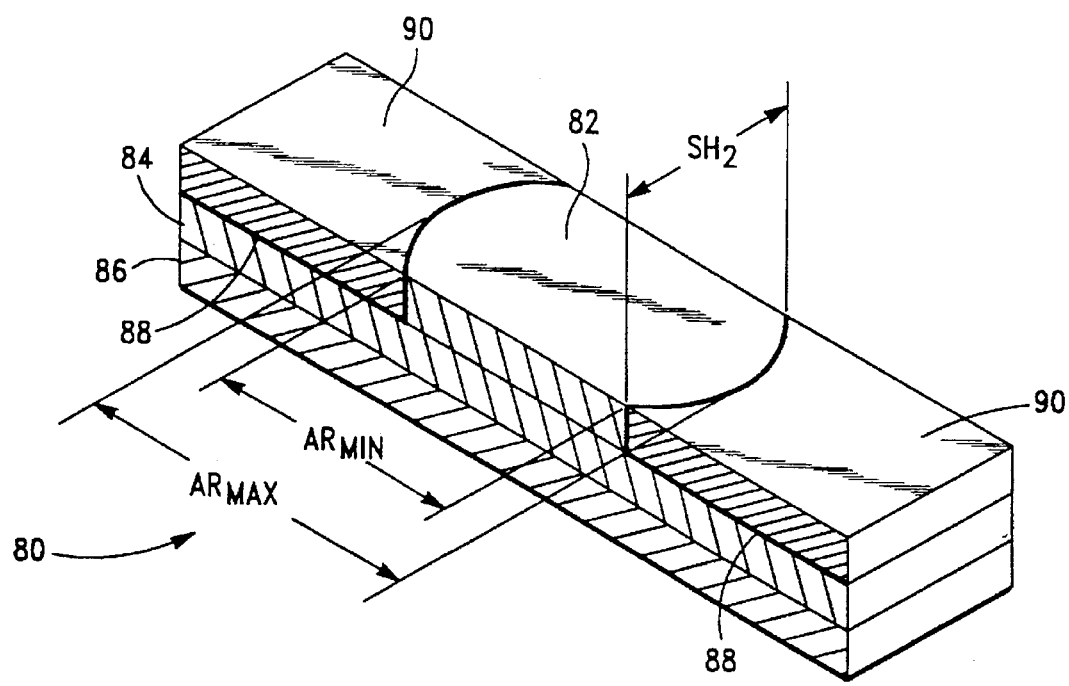
FIG. 3B is an additional isometric view of an MR element having an elliptically shaped conductive region in accordance with a particular embodiment disclosed in the aforementioned U.S. Pat. No. which has significant advantages in lowering the demagnetization energy density near the magnetoresistive conductive region-to-permanent magnet region junction.

With reference additionally now to FIG. 3B an additional isometric view of an MR sensor 80 similar in structure to the MR sensor 60 of FIG. 3A is shown wherein the MR sensor 80 active region has a substantially elliptical shape. MR sensor 80 includes an elliptically patterned MR layer 82 overlying a magnetic spacer layer 84 which, in turn, overlies a soft adjacent layer 86. A pair of conformably shaped permanent magnet layers 90 provide longitudinal bias to the MR layer 82 and are separated therefrom by correspondingly shaped separation layers 88 at the off-track boundaries of the active region of the MR sensor 80.

In this embodiment, the off-track boundaries of the active region of the MR layer 82 vary between a distance $AR_{MAX}$ along the central longitudinal axis and $AR_{MIN}$ at the edge portions of the MR sensor 80. The stripe height of the active region is substantially $SH_2$ over the length $ARM_{MIN}$ and lesser out toward the off-track boundaries.

It has been found that, in some instances, the longitudinal bias from the permanent magnet layers 90 in the MR sensor 80 may not penetrate directly into the active region (beyond the lead contact edges, not shown) due to the fact that the flux can leak across the gaps more and more as the distance from the permanent magnet layers 90 increases.

Figure 4:
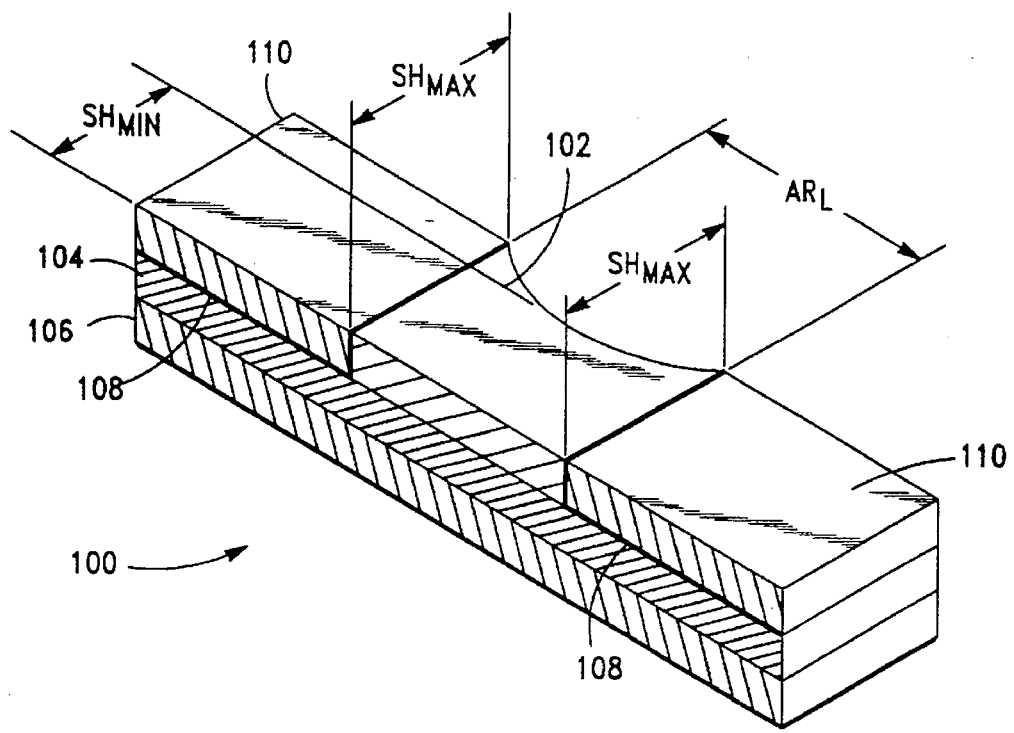
FIG. 4 is a simplified isometric view of an MR sensor having a concave shaped active region in accordance with a particular embodiment of the present invention utilizing a permanent magnet thin film longitudinal bias technique.

With reference now to FIG. 4, an MR sensor 100 in accordance with the present invention is shown wherein the active region has a concave shape in the direction of the ABS. MR sensor 100 includes a concave patterned MR layer 102 (which may be generally in the range of 200 Å–500 Å of NiFe or other suitable ferromagnetic material) overlying a magnetic spacer layer 104 (which may comprise approximately 100 Å–250 Å of Ta or other suitable magnetic spacer material) which, in turn, overlies a soft adjacent layer 106 (which may be generally in the range of 200 Å–500 Å of NiFeMo or other suitable soft magnetic material). A pair of permanent magnet layers 110 (which may comprise CoPt, CoPtCr, CoPtTa or other suitable permanent magnet material) provide longitudinal bias to the MR layer 102 and are separated therefrom by separation layers 108 at the off-track boundaries of the active region of the MR sensor 100. The separation layers 108 may, in a preferred embodiment, comprise a nonmagnetic material such as chromium of on the order of approximately 50 Å–250 Å in thickness.

In this embodiment, the shape of the active region of the MR layer 102 varies between a median stripe height of $SH_{MIN}$ and a stripe height of $SH_{MAX}$ at the off-track boundaries adjacent the permanent magnet layers 110. The length of the active region ("ARL") in the embodiment illustrated is substantially constant unlike the embodiment of FIG. 3B although it need not be so and may be substantially elliptical in shape as well.

In a preferred embodiment the shape of the MR layer 102 varies substantially parabolically as the distance to the center of the active zone is decreased. In practice, a conceptually ideal shape may be derived from an exponentially increasing function of the distance from the center line of the active region squared. This shape provides for a uniform effective bias field throughout the MR layer 22 that will effectively sweep out domain walls in the zero current state (@I=0. ma) and has a better chance of resulting in a single domain state when the bias current is turned on.

For example, suppose that the MR stripe height (S) is given by:

$$s*\exp(K*(X**2)) \text{ microns} \qquad \text{(Equation 1)}$$

where: X=distance from the center line, K is the spatial constant of the exponential curve, and s (or $SH_{MIN}$ in FIG. 4) is the height at the center.
When the structure is fully saturated in the X direction (to Ms), in the zero current state, the flux density in the gap, B, must accommodate the change in cross-sectional area with position. It is given by:

$$B=(dS/dX)*Ms*T(2.*S) \qquad \text{(Equation 2)}$$

where: T=thickness and the 2. comes from the two gaps, top and bottom.
Substitution of the derivative of equation (1) into equation (2) gives:

$$B=X*K*Ms*T \qquad \text{(Equation 3)}$$

This flux density is driven across the gaps by a magnetic potential difference, V. It is given by (note that Bgap=Hgap in air and there is a substitution from equation (3)):

$$V=G*B=X*G*K*MS*T \qquad \text{(Equation 4)}$$

where: G=the read gap.
This potential varies in an linear fashion across the width of the MR layer 22. The gradient of this potential corresponds to a longitudinal effective bias field, H, which is given by the derivative of equation (4):

$$H=dV/dX=G*K*Ms*T \qquad \text{(Equation 5)}$$

For example, consider the case where G=0.25u, T=0.05u and Ms=10,000 Gauss, and K=0.1/u*u. In this instance, the effective bias field at the center is:

$$H=12.5 \text{ Oersteds}$$

In the foregoing example, the large spatial constant (K=0.1/u*u) in equation (5) leads to a bias field that is more than strong enough to annihilate undesired domain walls. For a stripe height of 1.5u, the loss of efficiency due to this increase in effective Hk is only about 2.4% as will be more fully described hereinafter. In practical terms, the optimum trade off is a bias that is reliably sufficient to annihilate domain walls in the zero current condition and can be determined experimentally with bare MR elements in a Kerr microscope. A bias field of the order of Hk (e.g. 4 Oersteds) is presently considered to be adequate and a constant of K=0.032/u*u would give a bias field of this magnitude.

For such a low value of K, the exponential is very close to that of a simple parabola. Expanding equation (1) gives:

$$S=s*\exp(K*X*X)=s*(1.+k*X*X+(K*X*X)**2/2.+\ldots) \qquad \text{(Equation 6)}$$

or $$S=s*(1.+K*X*X) \text{ approximately}$$

If the permanent magnet layers 110 are 3u from the center line, then the total growth in stripe height in going from the center to the permanent magnet layers 110 is 33% for the accurate formula (equation 1) and 29% for the parabolic approximation. For a stripe height at the center of s=1.5u, this is only 0.5u's more at the PM. At the lead contact boundary (e.g. 1.5u from the center line) the increase is only 7% of the center line stripe height $SH_{MIN}$.

When the sense current is turned on and the magnetization rotates out to 45 degrees, the increase in effective Hk will go down substantially. The effective Ms*T in this condition is only 42% of the no current condition as will be more fully described hereinafter. Therefore, the reduction in effective MR permeability is only 30% and not 50%. By adjusting K to the minimum value that achieves reliable stability, the impact on effective permeability can be minimized. Even at 12.5 Oersteds of effective bias the loss of signal is negligible and on the order of 2.4%.

The influence of increased bias on MR efficiency may be explained as follows wherein the signal flux in the shielded element is:

$$B=(Bo/(1.-\exp(-2*c*s)))*(\exp(-c*Y)-(\exp(c*Y))*\exp(-2*c*s)) \qquad \text{(Equation 7)}$$

where: s=stripe height, Y=distance from the ABS, G=gap, u=relative permeability, T=the thickness of the MR element without the SAL 106, and c=the spatial decay constant of the MR given by $$c=SQRT(2./(GuT))=0.33/\text{micron} \qquad \text{(Equation 8)}$$

For G=0.25 microns, T=0.03 microns and u=2500.
Proof that this is the correct set of equations follows and the element efficiency relative to the u=infinity may be given as (note that Integral B dY maximum=0.5*Bo*s):

$$\text{Eff} = (\text{Integral}(B*dY)\text{from } Y = 0. \text{ to } Y = s)/(0.5*Bo*s) \qquad \text{(Equation 9)}$$

$$\text{Eff} = (2Bo*s)*(Bo/(1. - \exp(-2*c*s))*(1/c)*(-\exp(-c*Y)-\exp(c*y-2*c*s)) \bigg|_0^s \qquad \text{(Equation 10)}$$

$$\text{Eff} = (2.c*s)*((1. - \exp(-c*s))**2)/(1. - \exp(-2*c*s)) \qquad \text{(Equation 11)}$$

Equations 8 and 10 can be used to evaluate the efficiency loss for reduced effective permeability due to a bias field. The bias field that results from a parabolically shaped MR layer 102 is less when the sense current saturates the soft adjacent layer 106 in the Y direction and rotates the MR layer 102 to 45 degrees. In this condition the net magnetization in the X direction is only 42% of the unrotated case.

$$Mbias/Mno \text{ bias}=(Mmr*0.707)/(Mmr+Msal)=0.707/(1.+0.707)=0.42 \qquad \text{(Equation 12)}$$

Therefore a 12.5 Oersted bias with no sense current becomes a 5.2 Oersted bias with the sense current on. If Hk is 4 Oersteds, then the effective Hk is 9.2. Therefore the permeability is 1087 and the spatial constant c is increased by a factor of the square root of 9.2/4. That is, c=0.5 instead of c=0.33. Substituting these two values of c into Equation 10 for s=1.5 microns gives efficiencies of 95.6% and 98% respectively, or a reduction of only 2.4%.

Proof that Equation 7 is the correct equation for B is as follows. The signal flux density, B, leaks across the gap in response to a magnetic potential, V that also drive B down the element.

$$dV/dY=Hy=B/u \quad \text{(Equation 13)}$$

The leakage flux, Bl, is (2 gaps):

$$Bl=2*V/G \quad \text{(Equation 14)}$$

This flux subtracts from B (by substitution of Equation 14 and the integral of Equation 13:

$$d(B*T)/dY=Bl=2*V/G=(2/(G*u))*\text{integral}(B*dY) \quad \text{(Equation 15)}$$

Taking the derivative of Equation 7 and the integral of Equation 7 gives:

$$T*(Bo/(1.-\exp(-2*c*s)*(-c*\exp(-c*Y)+c*\exp(c*Y-2*c*s))= (2/Gu)*(Bo/(1.-\exp(-2*c*s))*(1/c)*(-\exp(-c*Y)+\exp(c*Y-2*c*s)) \quad \text{(Equation 16)}$$

Canceling terms gives:

$$T*c=2/Guc \quad \text{(Equation 17)}$$

Therefore we get Equation 8 squared, that is:

$$c**2=2/GuT \quad \text{(Equation 18)}$$

Therefore Equation 7 and Equation 8 together satisfy the differential equations. It is easy to verify that Equation 7 goes to B=Bo at Y=0. and B=0. at Y=s.

As follows, it can be shown that the permanent magnet bias field, H, at zero sense current falls below Hk at a distance from the PM/MR junction of greater than 0.84 microns for conventional rectangular elements. The magnetic field of the permanent magnet layers 110, parallel to the MR layer 102, for approximately correct geometric variables, at a distance of X (microns) from the PM is given by:

$$H=800*\exp(-6.3*X) \text{ Oersteds} \quad \text{(Equation 19)}$$

This is derived in greater detail following. It is easy to verify that this is down to Hk (4 Oersteds) at X=0.84 microns from the source. Therefore the PM field of certain MR sensors performs the function of boundary stabilization but it does not penetrate into the active region. However, this has been shown to not be a problem for a design where the permanent magnets and electrical contacts are coincident. In this regard there is a penalty in the region near the PM due to excessive bias there. At ⅓u from the PM, the bias is a hundred Oersteds when the sense current is off and almost twice that when it is on. From Equation 11 above, this is the point where the efficiency falls below 50% and there may also be a symmetry problem associated with low bias angles in this region. In any case, a dead region of ⅔ microns (⅓u on each side) is a substantial fraction of a 2 u read width. By using the concave shape for the MR sensor 100 disclosed above and a carefully tuned permanent magnet layer 110 thickness (Mr*T just sufficient) this problem can be avoided.

With respect to Equation 19, the permanent magnet layers 110 to MR layer 102 junction can be thought of as a source of magnetic charge (or flux). Most of its flux is drawn down the MR layer 102 leaving a residual amount of flux, F, given by:

$$F=MRpm*Tpm-MSmr*Tmr-MSal*Tsal \quad \text{(Equation 20)}$$

where:

TPm, Tmr, Tsal are the thicknesses of the permanent magnet layers 110, MR layer 102, and soft adjacent layer 106 and MRpm, MSmr, MSsal are the corresponding remnant and saturation magnetizations. The magnetic charge source of this flux is repeatedly imaged in the shields with alternating signs and a half period of 2*G (G=MR to shield separation). For distances from the source, X, the X component of field as a function of X and Y (Y=0 at the bottom shield):

$$B(X,Y)= \sum_{n=1}^{n=\text{infinity}} (F/2*G)*\sin(n*Pi/2)*\sin(n*PiY/2*G)*\exp(-n*Pi*X/2*G) \quad \text{(Equation 21)}$$

This is the solution for Poisson's equation in two dimensions for a periodic, point like flux source that emits a total flux of F. At Y=G, (the plane of the MR) B is:

$$B(X)= \sum_{n=\text{odd}}^{n=\text{inf.}} (F/2*G)*\exp(-n*Pi*X/2W \times G) \quad \text{(Equation 22)}$$

The lowest term in this series is just the Wallace spacing loss equation for a bit space of 2*G and the derivation is required to get the proportionality constant right.

$$B(X>G)=(F/2*G)*\exp(-Pi*X/2*G) \quad \text{(Equation 23)}$$

Using Equation 19 with all the magnetization equal to 10,000 and the thickness of the permanent magnet layers 110, MR layer 102, and soft adjacent layer 106 approximated as 0.09, 0.03, and 0.02 microns respectively, and the gap as 0.25 microns:

$$B/u=H=800*\exp(-6.3*X) \text{ Oersteds} \quad \text{(Equation 24)}$$

In the following discussion, the effect of effective bias field on MR bias point may be determined and the bias field that is induced by a concave MR shape as in the MR sensor 100 can be as high as 12 Oersteds in the zero current state without changing the bias point by more than 5 degrees. This change can be corrected by adjusting the MR layer 102 and soft adjacent layer 106 thicknesses to restore the bias point to its present value.

In a soft adjacent layer biased type MR sensor, the MR is biased by the free poles of the SAL plus the current in the SAL. When the rotation of the MR is ideal, its demagnetization field plus sin(Theta) *Hkeffective balances this. A relatively uniform distribution in the bias angle, Theta, is achieved by this. (Note that: Hkeffective=Hk+Hshape+Hpm (Hpm is the PM field in active region at the sense current bias point). To a first approximation, the effective Hk at the bias point is Hk+Hshape. The shape (or stripe height) is given by S=s*exp(K*(X**2)) as previously shown in Equation 1. Hshape at the bias point is much less than Hspace at Isense=0 as described above. At the bias point Hspace= Hspace(I=0)*0.41 for a bias angle of 45 degrees (0.47 for 40 degrees). This increase in Hk does not inhibit signal flux at the bias point however as will be more fully described hereinafter.

Even at low values of the sense current, the soft adjacent layer 106 is placed into the saturated condition by the larger current in the lower resistance MR layer 102. As a consequence, the SAL bias is more guaranteed.

This can be shown as follows, wherein the Hkeffective for which the free poles of the MR are exactly neutralized by the free poles of the SAL is:

$$\sin(\text{Theta}) * H_{\text{keffective}} = H_{sal} + H_{spacer} = (I_{sal} + I_{spacer})/(2*S) \text{ amps/meter} \quad \text{(Equation 25)}$$

where: Isal is the current in the soft adjacent layer 106, S is the stripe height, Hsal is the field in the MR layer 102 that is generated by the current in the SAL, Hspacer is the field in the MR or the SAL that is generated by the current in the spacer, and the 2 comes from the field path length going completely around the SAL.

For a 16 ma sense current with a typical geometry, the current in the SAL is 4.17 ma and 0.34 ma in the magnetic spacer layer 104. The 16 ma bias current divides between the soft adjacent layer 106, the magnetic spacer layer 104, and the MR layer 102 according to their thicknesses and resistivities. Thus, currents of: 4.17 ma, 0.34 ma, and 11.46 ma respectively correspond to thicknesses of 260 Å, 100 Å, and 300 Å respectively and resistivities of 62, 269, and 26 μ-Ohm-cm, respectively. Taking S=2.7 microns gives Hkeffective=835 amps/M or 10.5 Oersteds. Subtracting off 2.6 Oersted for Hk*sin(Theta), and noting that Hpm=0 in the active region gives Hexcess=7.9 Oersteds. If this excess field were exactly balanced by Hshape in the sense current "on" biased condition, then in the sense current "off" condition, Hshape is 1/0.47 times this value or 17 Oersteds. Therefore, a significant amount of Hshape is tolerable before this point (where the element is uniformly biased (e.g. sin(Theta)=(Mr*Tsal)/(Mr*Tmr).

In fact, this effect can be used with an exponentially shaped MR layer 102 to get uniform bias from edge to edge. By matching the increase in effective Hk from the shape (Hshape+Hk) to the field from the current in the soft adjacent layer 106, the value of this uniform rotation angle can be raised to the optimum point with the MR layer 102/SAL 106 thickness ratio. In this way, nonlinearities from saturation can be avoided while achieving a larger dynamic range.

For a rectangularly shaped MR element, as shown in the preceding example of FIG. 3A, (e.g. K=0) there is no Hshape so Heffective=Hk=4 Oersteds. But the field from the current in the soft adjacent layer 66 and the magnetic spacer layer 64 is much greater than this (10.5 Oersteds). Therefore even though the MR layer 62 near the ends will be at 40 degrees, this field will drive it towards 90 degrees near the center of the stripe. As Theta increases, the gradient of sin(Theta) will distribute free poles over the stripe. The gradient of these free poles will generate a field that resists the excess field (7.9 Oersteds=10.5–4.*sin(Theta)) from the current in the soft adjacent layer 66.

Analysis of this situation follows, and shows that an unshaped MR sensor 60 (FIG. 3A) that is pinned at 40 degrees at the ends will rotate up to a maximum of 56 degrees in the center. The average value of sin(Theta) determines the flux sensitivity of the element. It is equivalent to a weighted average angle of 50 degrees.

On the other hand, a shaped MR sensor 100 (FIG. 4), with K=0.1 (Hspace(@I=0)=12 Oersteds), will rotate up a maximum of 49 degrees. The weighted average of Theta (by sin(Theta) is 46 degrees. By adjusting the ratio of the MR layer 102 to SAL 106 thickness, the resistance can be kept the same while compensating the sensitivity with an increase in the average angle. Without compensation, the highly shaped biased MR sensor 100 herein discussed would have 92.6% of the sensitivity of a K=0 element (0.926=sin(45.2)/sin(50)).

Decreasing the shaped MR layer 102 thickness from 300 Å to 293 Å and increasing the SAL 106 thickness from 260 Å to 277 Å leaves the resistance of the MRS structure the same as before, thus leaving the power density at a given current the same as before. Even though the SAL 106 conductance loads down the MR layer 102 more, the MR layer 102 resistance change per unit of flux is greater and exactly compensates the loading effect. This geometry change brings the bias angle to 45 degrees at the ends and the maximum angle (in the center) to the previous value of 53 degrees. Therefore, the dynamic range on the high side is 3 degrees better and, on the low side, it has improved by 5 degrees. With this compensation, the weighted average angle increases to exactly the unshaped value of prior designs. If the dynamic range gain was used to further increase the bias angle then the MR sensor 100 design could gain a couple of percent on sensitivity over preceding designs. The analysis which follows further corroborates the fact that there is essentially no loss of flux efficiency as indicated previously.

Following is an analysis of the bias angle vs. distance from the air bearing surface (that surface of the MR sensor 100 shown in cross section in FIG. 4 opposite the concave portion of the MR layer 102) and assumes the symbols and equations of the preceding equations. The SAL 106 can be thought of as being fully saturated for its entire span in the Y direction (away from the ABS) except for a small region near the ends (Y=0. and Y=S=stripe height=2.7 microns). This is because the field of the current in the MR layer 102 and the magnetic spacer layer 104 together generate a 27.5 Oersted bias field on the SAL 106 (the integral of H around the spacer+MR=u*(Imr+Ispacer) and IMR=11.46 ma and Ispacer=0.34 ma for I=16 ma). The region that is less than fully saturated reduces to zero for a zero magnetic spacer layer 104 thickness. For a 100 Å magnetic spacer layer 104, the Hgs in this gap*2*spacer must be <u*(Imr+Ispacer) if Hk is neglected. Therefore Hgs<7,500 Oersteds.

Also this field integrated over the area of the transition region is the total flux in the SAL 106 (Mrsal,Tsal). Approximating this field as constant across the transition zone width, TZW, is (Mrsal=7,500 Gauss):

$$TZW*H=Mrsal*Tsal \quad \text{(Equation 26)}$$

so TZW=Tsal=260 Å=1% of the stripe height.

Therefore, this transition region may be neglected as being effectively infinitesimal (exchange forces enter at this level). Moreover, the flux of the SAL 106 fully inserts into the MR layer 102 right at the ends and thus biases it to an angle such that;

$$Mrmr*Tmr*\sin(\text{Theta}o) = Mrsal*Tsal = (7,500) \quad \text{(Equation 27)}$$
$$*.026 \text{ Gauss}*u$$
$$\sin(\text{Theta}o) = (7,500)*.026/(10,000*.03) = .65$$
$$\text{Theta}o = 40.5 \text{ degrees}$$

As distance increases from the ends, Theta is pushed towards larger angles by the field from the current in the SAL 106 and the magnetic spacer layer 104 together which is:

$$Hi=(10,000*u \text{ MKS to CGS})*(Isal+Ispacer)/(2.*S)=$$
$$10.5 \text{ Oersteds} \quad \text{(Equation 28)}$$

for Isal+Ispacer=4.5 ma and S=2.7u.

Theta is also pushed towards smaller angles by: Hk of the MR layer 102, Hshape of the shape and the field, Hq, from the gradient of the free charges that result from the gradient of sin(Theta), Hk and Hspace are fields in the X direction. When the sense current is on, Hshape is given by:

$$Hshape = K*G*Mrmr*Tmr*\cos(Theta) = Hs*\cos(Theta) \quad \text{(Equation 29)}$$

For Hs=K*G*Mrmr*Tmr.
This adds to Hk to produce an Hkeffective with:

$$Heffective = Hk + Hshape \quad \text{(Equation 30)}$$

The bias angle, Theta, attempts to adjust to all of these competing forces according to:

$$Hkeffective*(\sin(Theta)) = Hi + Hq \quad \text{(Equation 31)}$$

The field from the free poles in the MR layer 102, Hq, can be derived by considering the magnetic potential, Vq, that is its source:

$$Hq = d(Vq)/dY \quad \text{(Equation 32)}$$

and $$Vq = G*Bq \quad \text{(Equation 33)}$$

where Bq is the field in the gap that results from the free poles that are generated by a gradient in sin(Theta).

$$Bq = Mrmr*Tmr*(d\sin(Theta)/dY)/2 \quad \text{(Equation 34)}$$

where the 2 comes from the two gaps leaking flux from the MR layer 102 to the shields that are at magnetic ground potential. Putting together Equations 32, 33 and 34 gives:

$$Hq = (G*Tmr*Mrmr/2.)*d(d(\sin(Theta))/dY)/dY \quad \text{(Equation 35)}$$

$$Hq = Q*d(d(\sin(Theta))/dY)/dY \quad \text{(Equation 35)}$$

For Q=G*Tmr*Mrmr/2.
Putting together Equations 29, 30, 31 and 35 gives:

$$Hk*\sin(Theta) + Hs*\sin(Theta)*\cos(Theta) = Hi + Q*d(d(\sin(Theta))/dY)/dY \quad \text{(Equation 36)}$$

As can be seen, the second term in this equation presents a nonlinear differential equation type of difficulty. However, there are two factors that make this tractable. For unshaped elements, Hs=0 and so the term disappears. For shaped elements that are biased up to the vicinity of 45 degrees, this second term in effect becomes a constant in the equation. Also, because this term is substantially constant, the differential permeability of the MR layer 102 is not effected by Hs so there is essentially no efficiency impact of Hs. That is:

$$Hs*\sin(Theta)*\cos(Theta) = (Hs/2)*\sin(2*Theta) \quad \text{(Equation 37)}$$
and sin(2*Theta) = approximately 1.0 so:
$$Hs*\sin(Theta)*\cos(Theta) = \text{approx. } Hs/2.$$

Substituting this into Equation 36 and substituting U=sin (Theta) gives:

$$Hk*U - (Hi - Hs/2) = Q*d(d(U)/dY)/dY \quad \text{(Equation 38)}$$

Substituting $U = W + (Hi-Hs/2)/Hk$, $Z = 2*(Y-S/2)/S$ (e.g. $Z=\pm 1$. at ends), and $C = S*\sqrt{Hk/Q} = S*\sqrt{Hk/(2*G*Mrmr*Tmr)} = 0.441$ gives:

$$C*C*W = d(d(W)/dZ)/dZ \quad \text{(Equation 39)}$$

This equation has solutions of the form:

$$W = \exp(C*Z) \text{ and } W = \exp(-C*Z) \quad \text{(Equation 40)}$$

The symmetry of the situation then calls for:

$$W = E*(\exp(C*Z) + \exp(-C*Z)) \quad \text{(Equation 41)}$$

Where E is adjusted to give the correct angle (Thetao) at the ends (@Z=±1., W=sin(Thetao)−(Hi−Hs/2)/Hk)) according to Equation 26. That is:

$$E = W/(\exp(C*Z) + \exp(-C*Z)) \quad \text{(Equation 42)}$$
$$E = W/(\exp(C) + \exp(-C))$$
$$E = (\sin(Thetao) - (Hi - Hs/2)/Hk)/(\exp(C) + \exp(-C)) \quad \text{(Equation 42)}$$

Substituting U back into Equation 41 and noting that W=U−(Hi−Hs/2)/Hk) gives:

$$U = \sin(Theta) = (Hi - Hs/2)/Hk + E*(\exp(C*Z) + \exp(-C*Z)) \quad \text{(Equation 43)}$$

for A=(Hi−Hs/2)/Hk:

$$U = A + E*(\exp(C*Z) + \exp(-C*Z)) \quad \text{(Equation 44)}$$

Still required is the average value of U convoluted with the signal flux in order to calculate the MR sensor 100 sensitivity. To see that U is the relevant variable note that the MR response is:

$$Sig = DR/R = P*(\cos(Theta))**2 \quad \text{(Equation 45)}$$

$$dSig/dTheta = P*\sin(Theta)*\cos(Theta) \quad \text{(Equation 46)}$$

Since flux, F, is sin(Theta) and its change, dF/dTheta=cos (Theta):

$$dSig = P*dF*\sin(Theta) \quad \text{(Equation 47)}$$

Therefore a unit of signal flux, dF, produces signal voltage in proportion to sin(Theta)=U. Therefore this must be convoluted with the signal flux as a function of Z. For a high efficiency element the flux leaks uniformly across the gap and therefore diminishes to zero linearly from Z=−1 (at the air bearing surface) to Z=+1. (at the far end). So to a good approximation:

$$dF = dFo*(1-Z)/2. \quad \text{(Equation 48)}$$

Substituting this into Equation 46 and integrating from −1 to 1 gives:

$$dSig = (P*dFo/2.)*\text{Int}(-1 \text{ to } 1)(1-Z)*U \quad \text{(Equation 49)}$$

Since u is symmetric about zero and Z is asymmetric, the Z*U term contributes nothing. Therefore all that is required is U integrated over the element as stated above. Substituting Equation 44 gives:

$$dSig = (P*dFo/2)*\text{int}(-1 \text{ to } 1)(A + E*(\exp(C*Z) + \exp(-C*Z)) \quad \text{(Equation 50)}$$
$$dSig = (P*dFo/2)*(2*A + (2*E/C)*(\exp(C) - \exp(-C))$$
$$dSig = P*dFo*Uave$$

By defining:

$$Uave = \sin(Theta)ave = (A + (E/C)*(\exp(C) - \exp(-C)) \quad \text{(Equation 51)}$$

Therefore the MR sensor 100 sensitivity is proportional to that shown in Equation 51.

Utilizing the geometry described above, the maximum bias angle, Thetamax, and, the angle that corresponds to Uave, Thetaave=arcsin(Uave) may be calculated. For K=0 and K=.1 the calculation is tabulated below:

From Equation 29: Hs=K*G*Mrmr*Tmr=0.1*0.25*10,000.*0.03−7.5 Oersteds for K=0.1

From the definitions of Equations 38 and 39: C=0.441 per micron
From Equation 28: Hi=10.5 Oersteds
Hk=4 Oersteds throughout
From Equation 44 the definition of A=(Hi−Hs/2)/Hk
A=2.63 for K=0 and 1.69 for K=0.1
From Equations 27 and 42:
E=(sin(Thetao)−(Hi−Hs/2)/Hk)/(exp(C)+exp(−C))
E=−0.9 for K=0 and −0.47 for K=0.1
The maximum angle occurs at Z=0 so from Equation 44:

$$U\max = A + 2*E \quad \text{(Equation 52)}$$

and Thetamax=arcsin(Umax)=arcsin(A+2*E)
Thetamax=56.1 degrees for K=0 and 48.6 degrees
From Equation 51:

$$Uave = (A + E/C)*(\exp(C) - \exp(-C)) \quad \text{(Equation 53)}$$
$$Uave = A + 2.06*E$$

so Thetaave=arcsin(Uave)=arcsin (A+2.06*E)
Thetaave=50.5 degrees for K=0 and 46 degrees for K=0.1
Therefore there is only a 4.5 degree difference in the average weight bias angle. This corresponds to a sensitivity ratio of:

$$\text{sensitivity}(K=0.1)/\text{sensitivity}(K=0)=\sin(46)/\sin(50.5)=0.93$$

for no compensation in the MR/SAL thicknesses. On the other hand, if the thicknesses are compensated with the following conditions, then the difference between K=0 and K=0.1 disappears. These conditions are that the total resistance remain the same (same thermal power density at the same bias current) and that the Thetaave for each design be the same (same average bias point).

If Tmr goes from 300 Å to 293 Å and Tsal goes from 260 Å to 277 Å these conditions are met. It is easy to see that the resistance condition is preserved:

$$1/Rt=1/Rmr+1/Rsal+1/Rspacer=(0.716+0.261+0.023)/Rt$$

in an exemplary design, whereas in the present invention:

$$1/Rt=(0.716*293/300+0.261*277/260+0.023)/Rt=(0.699+0.278+0.023)/Rt=1.000/Rt$$

Therefore Rt has not changed. Note that A does not change automatically (A=1.69) and the primary change is that sin(Thetao)=Mrsal*Tsal/Mrmr*Tmr=0.65 in the exemplary design. In the present invention it is:

$$\sin(\text{Thetao})=0.65*(277/26)*(300/293)=0.709$$

$$\text{Thetao}=45.2 \text{ degrees}$$

C changes relatively little and is proportional to 1/sqrt(Tmr) so it is now:

$$Cnew=Cold*\text{sqrt}(300/293)=0.441*1.012=0.446$$

E from Equation 42 is:

$$Enew=(0.709-1.69)/2.202=-0.445 \text{ (vs Eold=}-0.47)$$

From Equation 53:

$$Uave=(A+(E/C)*(\exp(C)-\exp(-C))=0.77$$

so Thetaave=arcsin(Uave)=50.4 degrees. This compares favorably with the K=0 value of the exemplary design. It is even better on dynamic range, however, with respect to Thetamax and Thetamin.

Thetamax can be derived from Umax in Equation 52:

$$Umax=A+2*E=1.69-2*0.445=0.80$$

Thetamax=arcsin(Umax)=53.1 degrees vs 56.1 degrees in the exemplary K=0 design. Therefore there are 3 more degrees between Thetamax and saturation. Thetamin was previously 40.5 degrees but in the new design it is 45.2 degrees so 4.7 degrees of margin has been gained on the low side.

One remaining issue is that the MR element in the new design will respond with a greater dR/R to a unit of flux because it is thinner. This will also consume half the bias point margin improvement calculated above (the thickness ratio is 1.02 and sin(56)/sin(53)=1.04). The signal strength gain (2%) is also offset by a greater load down effect from the thicker SAL 106. Fortuitously, these two effects exactly cancel. To demonstrate this, the ratio of the new to the previous design load effects is:

Load New/Load Old=Rsalnew/(Rsalnew+Rmrnew)/Rsalold/(Rsalold+Rmrold)

Using Rsalold/Rmrold=2.74 from the previous resistance calculations:
The new ratio is:

Rsalnew/Rmrnew=(Rsalold/Rmrold)*(260/277)/(300/293)=2.51

Load New/Load Old=2.51/(2.51+1)/(2.74/(2.74+1)=0.976

Note that the Tmrold/Tmrnew=0.977 so the two effects cancel exactly.

Figure 5:
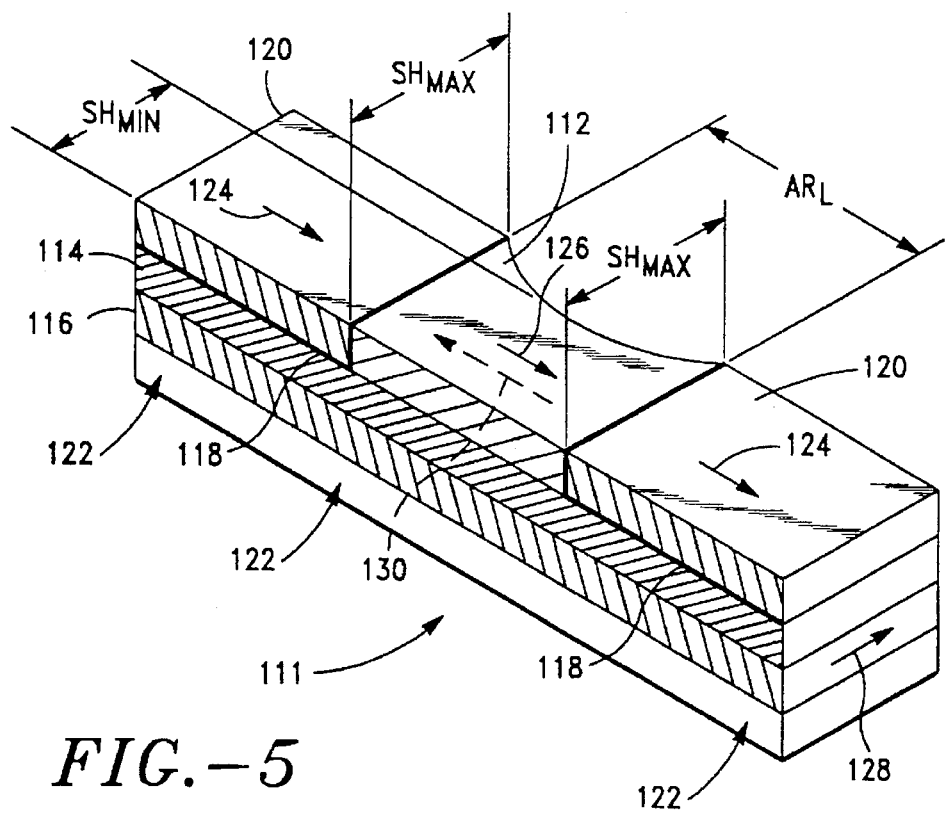
FIG. 5 is an additional simplified isometric view of a Spin Valve type Giant Magnetoresistive sensor having a concave shaped free layer in accordance with another embodiment of the present invention.

The concave sensor shape of the present invention described above with respect to the assurance of single domain bias for an MR sense element, can also be used in the context of Spin Valve (SV) and Giant Magneto-Resistive (GMR) sensors. The term Spin Valve is applied to a particular GMR type sensor. An example of a Spin Valve sensor 111 is shown in FIG. 5. In this type of GMR sensor, half of the magnetic layers are pinned by contact with an antiferromagnetic layer. The antiferromagnetic layer 122 may comprise, for example, MnFe (50%–50%), NiO, CoO, NiO/CoO, NiFeMn, or numerous other materials. The antiferromagnetic layer 122 forces (or pins) the magnetization of the magnetic layer 116 that contacts it into a transverse magnetic orientation that is illustrated by arrow 128. The magnetic layer 116 may comprise Co, Fe, Ni, an alloy of these elements, or any other ferromagnetic material that conducts electricity. It may also be subdivided into multiple layers of these materials. A predominance of Co in some of these sublayers often produces the largest GMR effect.

Above the pinned ferromagnetic layer 116 is a conductive spacer layer 114 comprising, for example, Cu, Ag, Au, or numerous other highly conductive materials. Copper has been found to exhibit the highest GMR effect. The freely rotating ferromagnetic layer 112 is magnetized in the longitudinal direction 126 by a longitudinal bias field 124, the concave shape of the free layer 112, and the longitudinally flowing sense current 130. The layer 112 may comprise a single or multiple mixed layers of Co, Fe, Ni, or any electrically conducting ferromagnetic material. Though the strongest GMR effect results from alloys with a predominance of Co, these alloys often have a high coercivity that results in multiple magnetic domains and therefore Barkhausen noise. For this reason, NiFe (80%–20%) is often used because it has a low coercivity. The use of a concave shape to the free layer 112 can provide sufficient longitudinal bias for the use of higher coercivity cobalt alloys with a larger GMR effect or for the more reliable use of NiFe.

The longitudinal bias field 124 is initiated at the ends of the free layer by permanent magnet structures 120 whose magnetization is indicated by the arrows 124. This longitudinal bias function can also be provided by a second antiferromagnetic structure if the ends of the free layer 112 are extended under or over the bias layer permanent magnet structures 120 and it may comprise a second antiferromagnetic material that pins the ends of the free layer 112.

Figure 6:
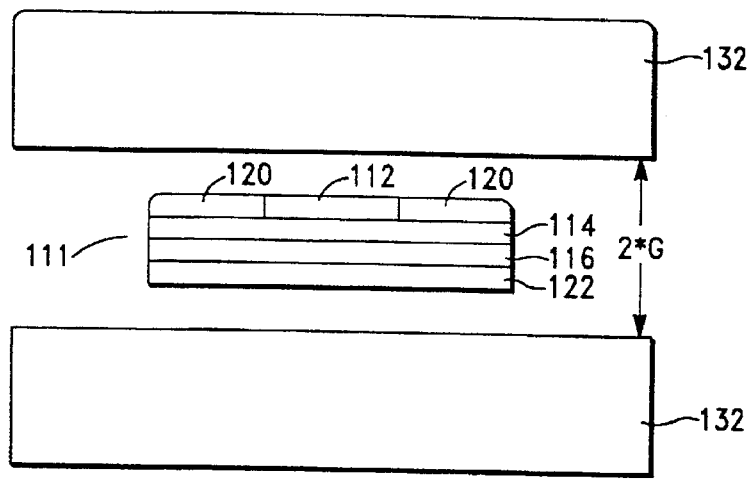
FIG. 6 is a cut away side elevational view of the Spin Valve sensor of FIG. 5 showing the same in conjunction with a pair of first and second shields.

The concave shape of the free layer 112 generates an effective longitudinal bias between two shields 132 as illustrated in FIG. 6. The previously described mathematical analysis provides that this is the case and also proves that the lack of concavity results in negligible bias at the center of a shielded element for either a Spin Valve structure or an MR device. A proper adjustment of the shape parameter, K (see Equation 1), yields an effective bias field, H (126), that is given by Equation 5. If this bias field is set to be significantly higher than the coercivity of the Spin Valve structure, single magnetic domains will result in the free layer. This single domain structure will then allow for smooth rotation of the free layer in response to the magnetic signal flux from the media. Its resistance will therefore change in a smooth way (no Barkhausen noise) according to:

$$\text{Delta } R/R = -((\text{Delta } R/R)\text{max}/2.)*\cos(\text{Phi}) \quad \text{(Equation 54)}$$

where Phi is the angle between the magnetization direction of the free layer 126 and that of the pinned layer 116. This change in resistance is caused by the GMR effect between these two layers. The resistance to the flow of current is minimal when the two layers are parallel (Phi=0.) and it is maximal when they are opposite (Phi=180 degrees). The sense current is optimally adjusted to balance the static magnetic field 128 of the pinned layer 116 such that the angle Phi is 90 degrees in the absence of signal flux from the media. Maximum sensitivity to signal flux and maximum dynamic range is obtained in this way.

While there have been described above the principles of the present invention in conjunction with specific device structure and permanent magnet thin film bias in conjunction with a thin separation layer, the foregoing description is made only by way of example and not as a limitation to the scope of the invention. Particularly, the principles of the present invention are also applicable to antiferromagnetic longitudinal bias techniques, spin valve type sensors, GMR devices and to those MR devices not utilizing a separation layer. Moreover, although illustrated in a particular embodiment as a read head in a disk drive, the present invention is also applicable to use as a sensor in tape drives and other computer mass storage applications.

What is claimed is:

1. A magnetoresistive data transducer comprising;

a substantially planar and generally elongate substrate presenting a first longitudinal axis thereof extending between first and second end portions and a second lateral axis thereof at a substantially median point between said first and second end portions;

first and second longitudinal biasing elements overlying said substrate presenting respective first and second lateral edges adjoining said first and second end portions of said substrate and respective first and second medial edges displaced from said substantially median point; and a magnetoresistive region overlying said substrate extending substantially between said first and second medial edges of said first and second longitudinal biasing elements, said magnetoresistive region having a width dimension generally parallel with the plane of the substrate and said second lateral axis and normal to the first longitudinal axis, the width of said magnetoresistive region increasing as it is measured at greater distances from said second lateral axis.

2. The data transducer of claim 1 wherein said first and second longitudinal biasing elements comprise permanent magnet layers.

3. The data transducer of claim 2 wherein said permanent magnet layers comprise CoPt.

4. The data transducer of claim 1 wherein said magnetoresistive region comprises NiFe.

5. The data transducer of claim 1 wherein said increasing width is defined by a concavity in a side of said magnetoresistive region extending between said first and second medial edges.

6. The data transducer of claim 5 wherein said concavity varies parabolically as the distance from said first and second medial edges to said substantially median point is decreased.

7. The data transducer of claim 5 wherein said concavity is defined by an exponential function of the square of the distance from a center line perpendicular to said first axis through said substantially median point to said first and second medial edges.

8. The data transducer of claim 7 wherein a stripe height (S), defined with respect to said second lateral axis, of said data transducer is substantially defined by the equation $S=s*\exp(k*(x^2))$ where s is the stripe height at said substantially median point, x is the distance from said center line and k is the spatial constant of said exponential function.

9. The data transducer of claim 1 further comprising first and second separation layers interposed between said magnetoresistive region and said first and second medial edges of said first and second longitudinal biasing elements.

10. The data transducer of claim 1 further comprising:

a head disk assembly;

at least one magnetic storage media rotatably contained within said head disk assembly having data encodable thereon; and at least one positioner mechanism movably contained within said head disk assembly for positioning said data transducer with respect to said storage media to enable reading of selected portions of said data.

11. A magnetoresistive device comprising:

a magnetoresistive structure presenting first and second oppositely disposed end portions transverse to a first axis thereof and first and second side portions transverse to a second axis thereof extending between said first and second end portions with a substantially median point defined between said first and second end portions, the magnetoresistive structure having an active sensing region defined by the first and second oppositely disposed end portions and the first and second side portions and a stripe height defined as a distance between the first and second side portions, said stripe height increasing in value when measured at different locations between said substantially median point to said first and second oppositely disposed end portions; and first and second longitudinally biasing elements disposed adjacent to said first and second end portions of said magnetoresistive structure.

12. The magnetoresistive device of claim 11 wherein said first and second longitudinal biasing elements comprise permanent magnet layers.

13. The magnetoresistive device of claim 12 wherein said permanent magnet layers comprise CoPt.

14. The magnetoresistive device of claim 11 wherein said active sensing region comprises NiFe.

15. The magnetoresistive device of claim 11 wherein said stripe height is defined by a concavity in at least one of said first and second side portions of said active sensing region.

16. The magnetoresistive device of claim 15 wherein said concavity varies parabolically from said oppositely disposed end portions to a center line substantially parallel to said oppositely disposed end portions extending through said substantially median point.

17. The magnetoresistive device of claim 15 wherein said concavity is defined by an exponential function of the square of the distance from a center line perpendicular to said first axis through said substantially median point to said first and second oppositely disposed end portions.

18. The magnetoresistive device of claim 17 wherein said stripe height (S) of said magnetoresistive device is substantially defined by the equation $S=s*exp(k*(x^2))$ where s is the stripe height at said substantially median point, x is the distance from said center line and k is the spatial constant of said exponential function.

19. The magnetoresistive device of claim 11 further comprising first and second separation layers interposed between said active device region and said first and second longitudinal biasing elements.

20. The magnetoresistive device of claim 11 further comprising:

a head disk assembly;

at least one magnetic storage media rotatably contained within said head disk assembly having data encodable thereon; and at least one positioner mechanism movably contained within said head disk assembly for positioning said magnetoresistive device with respect to said storage media to enable reading of selected portions of said data.

21. A magnetoresistive sensor having first and second longitudinally biasing elements disposed adjacent to an active magnetoresistive region, the active magnetoresistive region having opposing first and second end portions adjacent to the first and second longitudinally biasing elements, and first and second side portions interconnecting the first and second end portions, said magnetoresistive region comprising:

an active track width substantially defined by a distance between said first and second end portions; and a stripe height defined by a distance between said first and second side portions, said stripe height decreasing in value when measured at increasing distances from said first and second end portions toward a substantially median point.

22. The magnetoresistive sensor of claim 21 wherein said first and second longitudinal biasing elements comprise permanent magnet layers.

23. The magnetoresistive sensor of claim 22 wherein said permanent magnet layers comprise CoPt.

24. The magnetoresistive sensor of claim 21 wherein said active magnetoresistive region comprises NiFe.

25. The magnetoresistive sensor of claim 21 wherein said stripe height is defined by a concavity in at least one of said first and second side portions of said active magnetoresistive region.

26. The magnetoresistive sensor of claim 25 wherein said concavity varies parabolically from said opposing end portions to a center line substantially parallel to said opposing end portions extending through said substantially median point.

27. The magnetoresistive sensor of claim 25 wherein said concavity is defined by an exponential function of the square of the distance from a center line substantially parallel to said opposing end portions through said substantially median point to said first and second end portions.

28. The magnetoresistive sensor of claim 27 wherein said stripe height (S) of said magnetoresistive sensor is substantially defined by the equation $S=s*exp(k*(x^2))$ where s is the stripe height at said substantially median point, x is the distance from said center line and k is the spatial constant of said exponential function.

29. The magnetoresistive sensor of claim 21 further comprising first and second separation layers interposed between said active magnetoresistive region and said first and second longitudinal biasing elements.

30. The magnetoresistive sensor of claim 21 further comprising:

a head disk assembly;

at least one magnetic storage media rotatably contained within said head disk assembly having data encodable thereon; and at least one positioner mechanism movably contained within said head disk assembly for positioning said magnetoresistive sensor with respect to said storage media to enable reading of selected portions of said data.

31. A giant magnetoresistive sensor having first and second longitudinally biasing elements disposed adjacent to a freely rotating ferromagnetic layer, the ferromagnetic layer having opposing first and second end portions adjacent to the first and second longitudinally biasing elements, and first and second side portions interconnecting the first and second end portions, said sensor further including a structure comprising a pinning layer underlying a pinned layer and a spacer layer interposed between said freely rotating ferromagnetic layer and said pinned layer, said ferromagnetic layer comprising:

an active track width substantially defined by a distance between said first and second end portions; and a stripe height defined by a distance between said first and second side portions, said stripe height decreasing in value when measured at increasing distances from said first and second end portions toward a substantially median point.

32. The giant magnetoresistive sensor of claim 31 wherein said first and second longitudinal biasing elements comprise permanent magnet layers.

33. The giant magnetoresistive sensor of claim 32 wherein said permanent magnet layers comprise CoPt.

34. The giant magnetoresistive sensor of claim 31 wherein said freely rotating ferromagnetic layer comprises NiFe.

35. The giant magnetoresistive sensor of claim 31 wherein said stripe height is defined by a concavity in at least one of said first and second side portions of said freely rotating ferromagnetic layer.

36. The giant magnetoresistive sensor of claim 35 wherein said concavity varies parabolically from said opposing end portions to a center line substantially parallel to said opposing end portions extending through said substantially median point.

37. The giant magnetoresistive sensor of claim 35 wherein said concavity is defined by an exponential function of the square of the distance from a center line substantially parallel to said opposing end portions through said substantially median point to said first and second end portions.

38. The giant magnetoresistive sensor of claim 37 wherein said stripe height (S) of said giant magnetoresistive sensor is substantially defined by the equation $S=s*\exp(k*(x^2))$ where s is the stripe height at said substantially median point, x is the distance from said center line and k is the spatial constant of said exponential function.

39. The giant magnetoresistive sensor of claim 31 further comprising first and second separation layers interposed between said freely rotating ferromagnetic layer and said first and second longitudinal biasing elements.

40. The giant magnetoresistive sensor of claim 31 further comprising:

a head disk assembly;

at least one magnetic storage media rotatably contained within said head disk assembly having data encodable thereon; and at least one positioner mechanism movably contained within said head disk assembly for positioning said giant magnetoresistive sensor with respect to said storage media to enable reading of selected portions of said data.

* * * * *